(12) United States Patent
Hamilton, II et al.

(10) Patent No.: US 8,272,041 B2
(45) Date of Patent: *Sep. 18, 2012

(54) FIREWALL CONTROL VIA PROCESS INTERROGATION

(75) Inventors: Rick A. Hamilton, II, Charlottesville, VA (US); Brian M. O'Connell, Cary, NC (US); John R. Pavesi, Cedar Park, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

This patent is subject to a terminal disclaimer.

(21) Appl. No.: 11/766,165

(22) Filed: Jun. 21, 2007

(65) Prior Publication Data

US 2008/0320581 A1 Dec. 25, 2008

(51) Int. Cl.
*G06F 7/04* (2006.01)
*H04L 9/00* (2006.01)
(52) U.S. Cl. ............... 726/11; 726/12; 726/13; 726/14; 726/15; 713/151; 713/152; 713/153
(58) Field of Classification Search ............... 726/11
See application file for complete search history.

(56) References Cited

U.S. PATENT DOCUMENTS

| | | | |
|---|---|---|---|
| 6,161,182 A | 12/2000 | Nadooshan | |
| 6,219,790 B1 | 4/2001 | Lloyd et al. | |
| 6,584,505 B1 | 6/2003 | Howard et al. | |
| 6,651,096 B1 | 11/2003 | Gai et al. | |
| 6,754,820 B1 | 6/2004 | Scheidt et al. | |
| 7,039,812 B2 | 5/2006 | Kawan et al. | |
| 7,054,944 B2 | 5/2006 | Tang et al. | |
| 7,082,532 B1 | 7/2006 | Vick et al. | |
| 7,085,934 B1 | 8/2006 | Edwards | |
| 7,162,649 B1 | 1/2007 | Ide et al. | |

(Continued)

FOREIGN PATENT DOCUMENTS

EP   1 465 382 B1   10/2007

(Continued)

OTHER PUBLICATIONS

L. Chai, Non-Final Office Action: mail date Apr. 29, 2010; published by the USPTO in utility U.S. Appl. No. 11/765,004, pp. 15.

(Continued)

*Primary Examiner* — Longbit Chai
(74) *Attorney, Agent, or Firm* — Schmeiser, Olson & Watts; Mark Vallone

(57) ABSTRACT

Generally speaking, systems, methods and media for implementing a firewall control system responsive to process interrogations are disclosed. Embodiments of a method may include receiving a data request at a firewall where the data request is associated with a program and determining whether a process rule exists for the associated program, where the process rule includes a condition to be satisfied for a process of the user computer system. Embodiments may also include, in response to determining that a process rule does exist, determining a method for evaluating a status of the process and determining a current status of the process. Embodiments may also include determining whether the process rule is satisfied based on the current status of the process and using the determined evaluation method. Embodiments may also include, in response to determining whether the condition of the process rule is satisfied, performing one or more firewall actions.

20 Claims, 5 Drawing Sheets

U.S. PATENT DOCUMENTS

| | | | |
|---|---|---|---|
| 7,546,629 | B2 | 6/2009 | Albert et al. |
| 7,603,472 | B2 | 10/2009 | Petry et al. |
| 7,634,800 | B2 | 12/2009 | Ide et al. |
| 2002/0002688 | A1 | 1/2002 | Gregg et al. |
| 2002/0112155 | A1 | 8/2002 | Martherus et al. |
| 2002/0133719 | A1 | 9/2002 | Westerdal |
| 2003/0055962 | A1* | 3/2003 | Freund et al. ............ 709/225 |
| 2003/0177389 | A1* | 9/2003 | Albert et al. ............ 713/201 |
| 2004/0078591 | A1 | 4/2004 | Teixeira et al. |
| 2004/0103317 | A1* | 5/2004 | Burns ............ 713/201 |
| 2004/0128393 | A1 | 7/2004 | Blakley et al. |
| 2004/0187029 | A1 | 9/2004 | Ting |
| 2005/0055578 | A1 | 3/2005 | Wright et al. |
| 2005/0102244 | A1 | 5/2005 | Dickinson |
| 2005/0177869 | A1 | 8/2005 | Savage et al. |
| 2006/0005254 | A1 | 1/2006 | Ross |
| 2006/0155681 | A1 | 7/2006 | Chiang et al. |
| 2006/0265412 | A1 | 11/2006 | Griffiths et al. |
| 2007/0150553 | A1 | 6/2007 | Fields et al. |
| 2007/0172808 | A1 | 7/2007 | Capone |
| 2008/0019352 | A1 | 1/2008 | Bennett |
| 2008/0178260 | A1 | 7/2008 | Schwarz et al. |
| 2008/0271117 | A1 | 10/2008 | Hamilton et al. |
| 2008/0320580 | A1 | 12/2008 | Hamilton et al. |
| 2008/0320584 | A1 | 12/2008 | Hamilton et al. |

FOREIGN PATENT DOCUMENTS

| | | | |
|---|---|---|---|
| WO | WO 02/03178 A2 * | 1/2002 | |
| WO | WO 02/37728 A1 | 5/2002 | |
| WO | 2004034672 A1 | 4/2004 | |

OTHER PUBLICATIONS

ISR including PCT transmittal, from the International Searching Authority, mailed Nov. 5, 2008. Applicant: International Business Machines Corporation, International Application No. PCT/EP2008/057937, pp. 4.

PCT Written Opinion of International Searching Authority, mailed Nov. 5, 2008; Applicant: International Business Machines Corporation, International Application No. PCT/EP2008/057937, pp. 6.

ISR including PCT transmittal with PCT Written Opinion of International Searching Authority, From the International Searching Authority, mailed Jul. 18, 2008, Applicant: International Business Machines Corporation, International Application No. PCT/EP2008/054412, pp. 13.

Applicant's attorney Erik J. Osterrieder, Response to Final Office Action of U.S. Appl. No. 11/766 146, Aug. 23, 2010, Austin, TX, USA.

Final Office Action (Mail Date May 11, 2011) for U.S. Appl. No. 11/741,516, filed Apr. 27, 2007.

International Search Report dated May 20, 2009 for PCT/EP/2008/056192.

Preliminary Amendment dated Feb. 17, 2011 U.S. Appl. No. 11/766,146.

Final Office Action dated Oct. 19, 2010 for U.S. Appl. No. 11/766,146.

Non-Final Office Action dated Aug. 23, 2010 for U.S. Appl. No. 11/766,146.

Preliminary Amendment dated Feb. 17, 2011 U.S. Appl. No. 11/765,004.

Final Office Action dated Sep. 13, 2010 for U.S. Appl. No. 11/765,004.

Amendment in Response to Non-final Amendment dated Feb. 23, 2011 U.S. Appl. No. 11/741,516.

Non-Final Office Action dated Oct. 8, 2010 U.S. Appl. No. 11/741,516.

Final Office Action (Mail Date Apr. 16, 2012) for U.S. Appl. No. 11/765,004, filed Jun. 19, 2007.

Amendment filed Apr. 9, 2012 in response to Office Action (Mail Date Jan. 11, 2012) for U.S. Appl. No. 11/765,004, filed Jun. 19, 2007.

Amendment filed Apr. 24, 2012 in response to Office Action (Mail Date Feb. 1, 2012) for U.S. Appl. No. 11/766,146, filed Jun. 21, 2007.

Office Action (Mail Date Jan. 11, 2012) for U.S. Appl. No. 11/765,004, filed Jun. 19, 2007.

Office Action (Mail Date Feb. 1, 2012) for U.S. Appl. No. 11/766,146, filed Jun. 21, 2007.

Amendment and Request for Continued Examination filed Aug. 9, 2011 in response to Final Office Action (Mail Date May 11, 2011) for U.S. Appl. No. 11/741,516, filed Apr. 27, 2007.

Haffner, Ernst-Georg, et al., "Managing Distributed Personal Firewalls with Smart Data Servers," World Conference on WWW and Internet [Online] 2001, Retrieved from the Internet: URL: http:/wiki.uni.lu/secan-lab/Haffner2001.pdf; 6 pages.

ISR including PCT transmittal, From the International Searching Authority, mailed Feb. 23, 2009; Applicant: International Business Machines Corporation, International Application No. PCT/EP2008/057938, pp. 5.

PCT Written Opinion of International Searching Authority, mailed Feb. 23, 2009; Applicant: International Business Machines Corporation, International Application No. PCT/EP2008/057938, pp. 4.

Notice of Allowance (Mail Date May 9, 2012) for U.S. Appl. No. 11/766,146, filed Jun. 21, 2007.

Amendment filed May 31, 2012 in response to Final Office Action (Mail Date Apr. 16, 2012) for U.S. Appl. No. 11/765,004, filed Jun. 19, 2007.

Applicant's attorney Erik Osterrieder, Response to Non-Final Office Action of U.S. Appl. No. 11/765,004, Jul. 28, 2010, Austin, TX, USA.

Terminal Dislciamer of U.S. Appl. No. 11/765,004 in view of U.S. Appl. No. 11/766,165.

Terminal Dislciamer of U.S. Appl. No. 11/765,004 in view of U.S. Appl. No. 11/766,146.

Restriction Requirement for U.S. Appl. No. 11/741,516, Aug. 4, 2010, Alexandria, VA, USA.

Applicant's attorney Erik Osterrieder, Response to Restriction Requirement for U.S. Appl. No. 11/741,516, Aug. 5, 2010, Austin, TX, USA.

Non-Final Office Action of U.S. Appl. No. 11/766,146, May 27, 2010, Alexandria, VA, USA.

* cited by examiner

FIREWALL CONTROL VIA PROCESS INTERROGATION

FIELD OF INVENTION

The present invention is in the field of data processing systems and, in particular, to systems, methods and media for implementing a firewall control system responsive to process interrogations.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors. Connection to other systems via the Internet, however, brings with it the risk of compromise of the computer system and the data located on it from viruses, worms, Trojan horses, hackers, or other types of attacks. System developers often utilize firewalls that control traffic to and from a network to help protect the computer systems from outside attack and to otherwise control information flow to and from a computer system.

Firewall products, which are often distributed as software application programs, can be considered to fall into one of two broad categories: corporate network firewalls and personal firewalls. Corporate network firewalls (also referred to as sub-net firewalls or non-personal firewalls) monitor traffic at a network bottleneck, such as at a point where a corporate intranet interfaces to the Internet. At this position, all of the computers on the corporate intranet can be protected from threats outside the intranet originating from the Internet. This is a cost effective and efficient solution for corporations or other organizations as firewall products need only be installed and administered at the one or more key networking interfaces between the intranet(s) and the Internet. Corporate network firewalls may also monitor traffic at a network bottleneck, such as at a point where a general corporate network interfaces with a high-security corporate network, such as at a lab or research organization.

The second broad category of firewall product is a "personal" firewall that runs directly on a computer system. Some are distributed or provided as a separate application program, while others, such as Microsoft Corporation's Microsoft® Windows firewall are embedded in an operating system. While a personal firewall protects the computer system from threats coming from its wireless or wired network interfaces, its configuration, preferences, and performance is typically limited when compared to a corporate network firewall.

These software firewalls provide some customizable ability to restrict, allow, or monitor attempts of a particular program to send or receive data. Currently these decisions may be responsive to the network subnet the user is currently connected to, the day or time, whether requested data is inbound or outbound, whether the requested data is of a certain protocol (TCP, UDP, TCP and UDP, and ICMP), the port number to receive or send data through, the IP address or network the requested data is being sent to or received from, and the user's network adapter being used. One solution used in locations with WiFi access requires users to authenticate via a browser (such as by making payment with a credit card) before being able to use the WiFi connection. This solution requires the user to know which program to launch first in order to authenticate and only provides a simple block/no-block firewall response. Such solutions, accordingly, provide a relatively broad level of control, but do not provide for a more sophisticated, precise control of data packets going through the firewall.

SUMMARY OF THE INVENTION

The problems identified above are in large part addressed by systems, methods and media for implementing a firewall control system responsive to process interrogations. A method for controlling a firewall for a user computer system is disclosed. Embodiments of the method may include receiving a data request at a firewall where the data request is associated with a program of the user computer system. Embodiments of the method may also include determining whether a process rule exists for the associated program, where the process rule includes a condition to be satisfied for a process of the user computer system. Embodiments of the method may also include, in response to determining that a process rule does exist, determining a method for evaluating a status of the process and determining a current status of the process. Embodiments of the method may also include determining whether the process rule is satisfied based on the current status of the process and using the determined evaluation method. Embodiments of the method may also include, in response to determining whether the condition of the process rule is satisfied, performing one or more firewall actions.

Another embodiment provides a computer program product comprising a computer-useable medium having a computer readable program wherein the computer readable program, when executed on a computer, causes the computer to perform a series of operations for controlling a firewall. The series of operations generally includes receiving a data request at a firewall where the data request is associated with a program of the user computer system. The series of operations may also include determining whether a process rule exists for the associated program, where the process rule includes a condition to be satisfied for a process of the user computer system. The series of operations may also include, in response to determining that a process rule does exist, determining a method for evaluating a status of the process and determining a current status of the process. The series of operations may also include determining whether the process rule is satisfied based on the current status of the process and using the determined evaluation method. The series of operations may also include, in response to determining whether the condition of the process rule is satisfied, performing one or more firewall actions.

A further embodiment provides a firewall system implemented on a computer system. The firewall system may include a network stack to interrogate incoming and outgoing data packets and to apply one or more firewall rules against them to allow or deny the data packets access to a program of a user computer system. The firewall system may also include a process interrogation controller in communication with the network stack to further control access to data packets. The process interrogation controller may include a process monitor, a process store interface module, a process-condition analyzer, and a firewall action manager. The process monitor may determine a current status of processes of the user computer system. The process store interface module may receive process rules associated with particular programs, where the process rules include conditions to be satisfied for particular processes of the user computer system. The process-condition analyzer may determine whether conditions of the process rules are satisfied based on the current status of a process. The firewall action manager may perform one or more firewall actions in response to a determination of whether process rules are satisfied for a particular process.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

Figure 1:
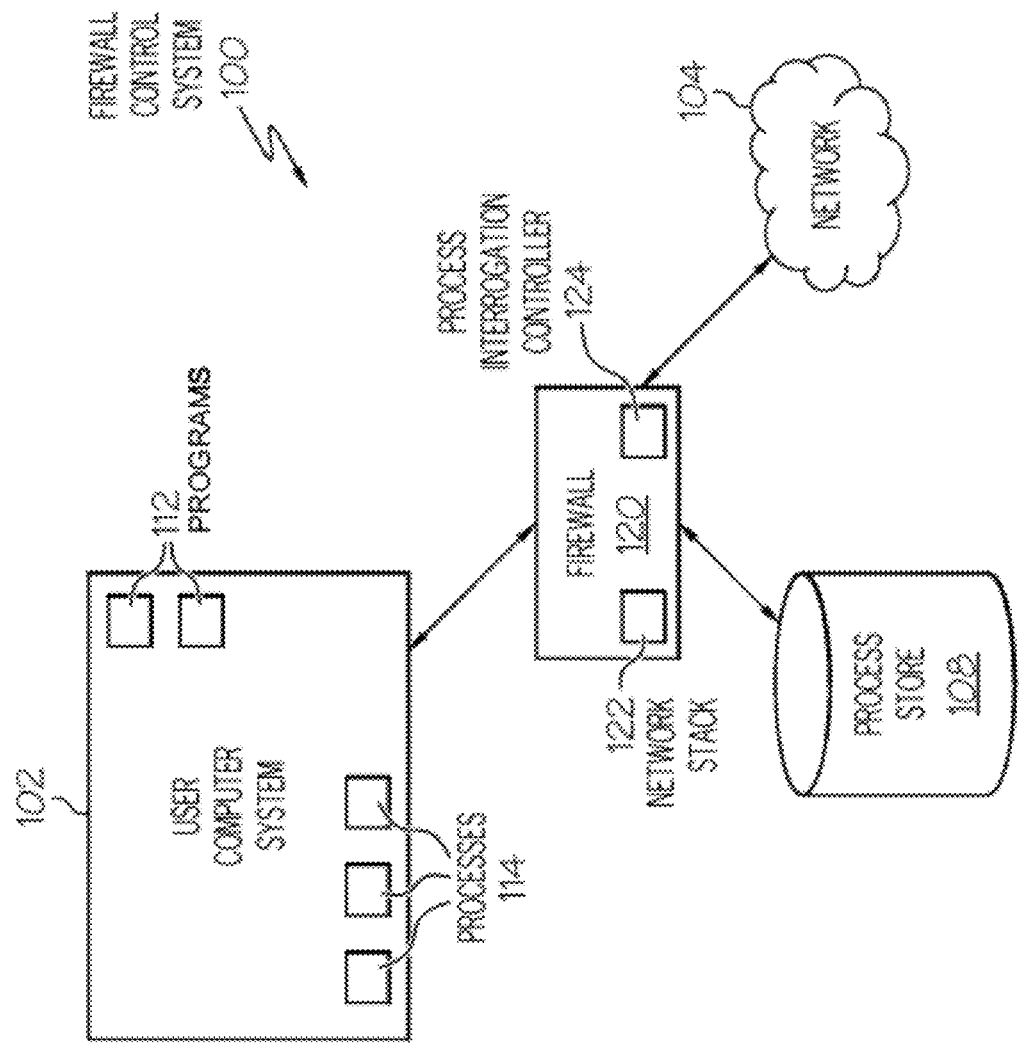
FIG. 1 depicts an environment for a firewall control system with a user computer system, firewall with process interrogation controller, and a process store according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for implementing a firewall control system responsive to process interrogations are disclosed. A method for controlling a firewall for a user computer system is disclosed. Embodiments of the method may include receiving a data request at a firewall where the data request is associated with a program of the user computer system. Embodiments of the method may also include determining whether a process rule exists for the associated program, where the process rule includes a condition to be satisfied for a process of the user computer system. Embodiments of the method may also include, in response to determining that a process rule does exist, determining a method for evaluating a status of the process and determining a current status of the process. Embodiments of the method may also include determining whether the process rule is satisfied based on the current status of the process and using the determined evaluation method. Embodiments of the method may also include, in response to determining whether the condition of the process rule is satisfied, performing one or more firewall actions.

The system and methodology of the disclosed embodiments allows for effective and efficient control of a firewall by utilizing process interrogation of a user computer system to "fine-tune" firewall control based on the particular processes, and their status, currently executing on the user computer system. Firewalls according to the disclosed embodiments are given the ability to check the status of active processes of the user computer system to perform firewall actions such as allowing or deny access, redirecting data packets to another system, or beginning monitoring in response. Firewalls may thus be controlled with increased sophistication, particularly with respect to controlling firewall usage related to individual programs. Data flow to and from a particular program may thus be controlled based on what other processes are executing on the user computer system. A firewall may block data from a particular peer to peer (P2P) client, for example, if one or more high-bandwidth programs such as Microsoft® NetMeeting or a remote control program are currently running. The disclosed system may be useful for all types of software firewalls, including personal and non-personal (network) firewalls.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a firewall control system with a user computer system, firewall with process interrogation controller, and a process store according to some embodiments. In the depicted embodiment, the firewall control system 100 includes a user computer system 102 in communication with a network 104 through firewall 120. The user computer system 102 may include one or more programs 112 to send or receive information to and from network 104. The user computer system 102 may also have one or more processes 114 executing on it at a particular time. As will be described in more detail subsequently, the firewall 120 may control data to and from a particular program 112 based on the processes 114 executing on the user computer system 102. The firewall 120 may be in communication with a process store 108 (that includes information about process requirements for a particular program 112) directly, via network 104, or other connection, or the process store 108 may be included within firewall 120 or one of its components.

A user of the user computer system 102 may utilize programs 112 during the course of their normal usage or such programs 112 may execute automatically or without user intervention. Transmission and receipt of data packets to and from a program 112 may advantageously be controlled by firewall 120. Programs 112 may include any type of software application, including browsers, P2P clients, e-mail programs, file transfer programs, desktop applications, Internet telephony applications, remote control applications, video conference applications, or any other type of application. Processes 114 may include any software process executing on a processor or resident of memory of the user computer system 102, and may include processes 114 associated with programs 112, anti-virus or other security programs, operation system processes, or any other processes.

Users may utilize a user computer system 102 according to the present embodiments to access network 104 via firewall 120 for transmitting and receiving information.

Figure 2:
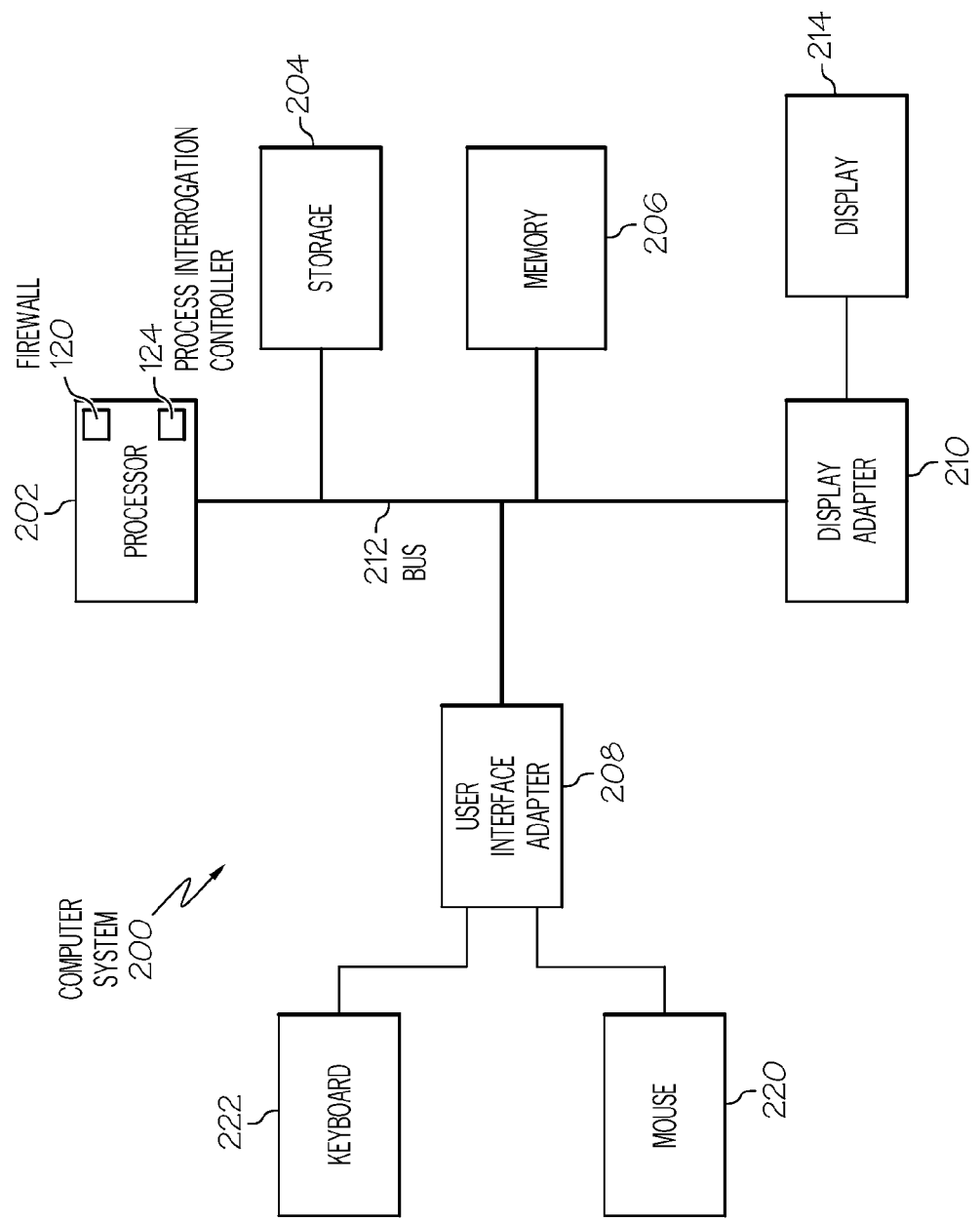
FIG. 2 depicts a block diagram of one embodiment of a computer system suitable for use as a component of the firewall control system.

User computer system 102 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user may, for example, interact with the user computer system 102 via a user interface to configure processes 114 associated with a particular program 112.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may serve as network 104 and the firewall 120 may protect the user computer system 102 from Internet-based threats. Those skilled in the art will recognize, however, that the invention described herein may be implemented utilizing any type or combination of data communications channel(s) without departure from the scope and spirit of the invention.

Firewall 120 may be a software firewall implemented on a computer system such as user computer system 102 (for a personal firewall) or a server computer system (such as for a corporate firewall). Example firewalls include those from Symantec Corp., Check Point® Software Technologies Ltd., Microsoft Corp., McAfee Inc., and Lavasoft. Non-personal firewall vendors include companies such as Cisco Systems Inc., NetGear, Inc., Linksys® (a division of Cisco Systems, Inc.), and TRENDnet. As described previously, firewall 120 may control the flow of data packets between a user computer system 102 and the network 104. Firewall 120 may include a network stack 122 and a process interrogation controller 124. The network stack 122 is a component of the firewall software that interrogates incoming and outgoing data packets and applies various firewall rules against them to either allow or deny the packet access to and from the host. Firewall rules include allowing or denying packet access based on the network subnet the user is currently connected to, the day or time, whether requested data is inbound or outbound, whether the requested data is of a certain protocol (TCP, UDP, TCP and UDP, and ICMP), the port number to receive or send data through, the IP address or network the requested data is being sent to or received from, and the user's network adapter being used.

Figure 3:
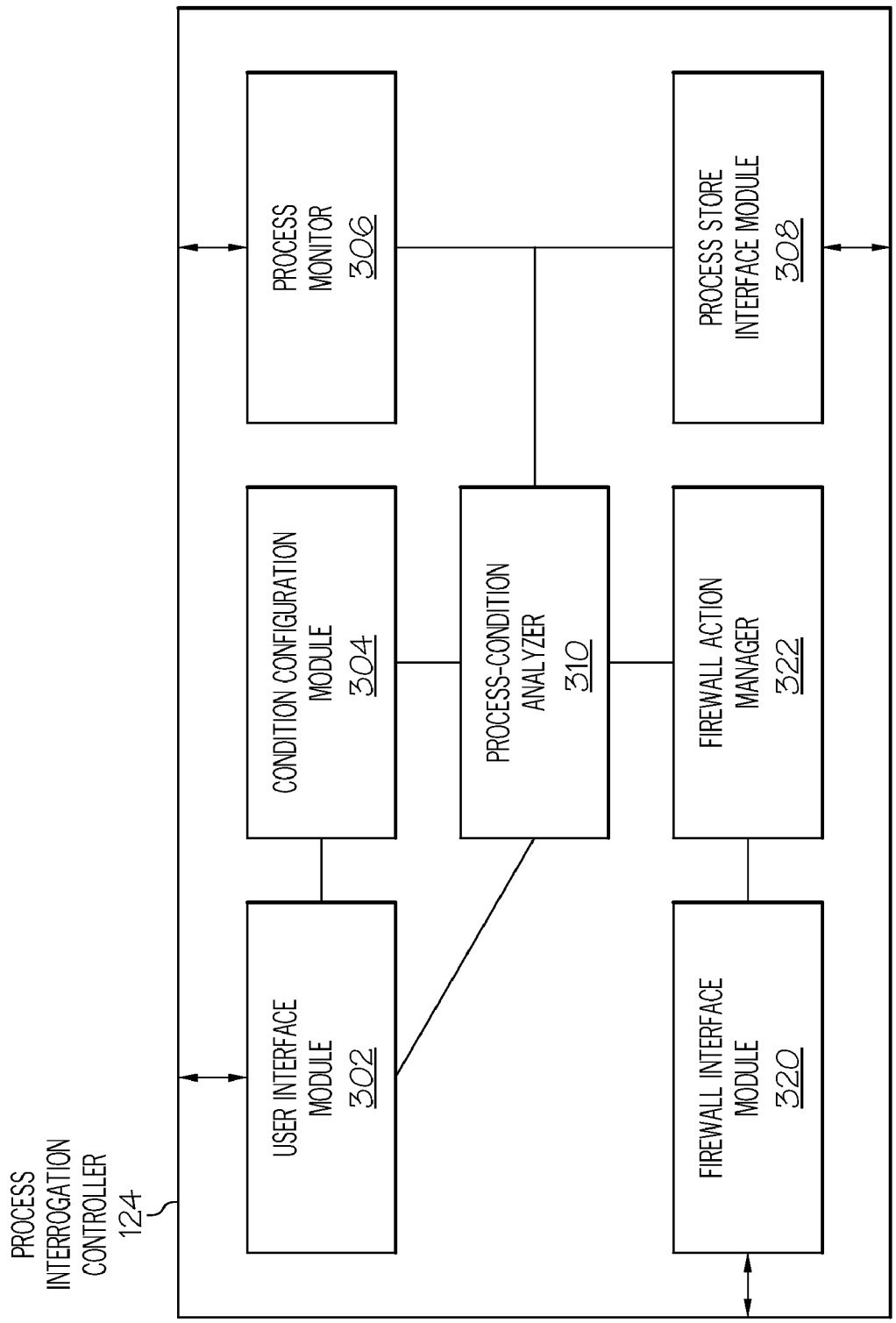
FIG. 3 depicts a conceptual illustration of software components of a process interrogation controller according to some embodiments.

The process interrogation controller 124, as described in more detail in relation to FIG. 3, may communicate with the network stack 122 and may provide further control of access to data packets according to the disclosed embodiments. Data packets may each have an associated program 112 that is transmitting or receiving the data packet. The process interrogation controller 124 may determine for a particular data packet whether a stored process rule exists for the program 112 associated with the data packet, where the stored process rule would include one or more conditions to be satisfied for particular processes 114 of the user computer system 102. The process interrogation controller 124 may then determine a current status of the processes 114 from the stored process rule and may determine whether conditions of the process rules are satisfied based on the current status of the processes 114. In response to such determination (whether satisfied or not satisfied), the process interrogation controller 124 may also perform one or more firewall actions, such as by limiting data to and from a program 112 if certain processes 114 are executing or not.

Process store 108 may include any type or combination of storage devices, including volatile or non-volatile storage such as hard drives, storage area networks, memory, fixed or removable storage, or other storage devices. The process store 108 in some embodiments may be an encrypted database of process rules for particular programs 112 of a user computer system 102. The process store 108 may be located in a variety of positions with the firewall control system 100, such as being a stand-alone component (perhaps implemented by a trusted third party on a remote server or network of servers) or as part of the user computer system 102 or firewall 120.

The process interrogation controller 124 may be implemented on any kind of firewall 120, including both personal firewalls and corporate, multi-user firewalls. For a personal firewall, the firewall 120 and process interrogation controller 124 may execute on the user computer system 102 that the firewall 120 is protecting. Accordingly, the process interrogation controller 124 may have access to information about processes 114 of the user computer system 102. For non-personal firewalls (such as corporate firewall appliances and router firewalls) that protect multiple user computer systems 102, the process interrogation controller 124 may need to query the remote user computer systems 102 in order to acquire process information, enabling the non-personal firewall to perform the disclosed functionality. A corporate or other organizational implementation may provide an efficient means of modifying rules and applying them to any programs 112 for a wide variety of users. How data flow to and from a particular program 112 is best handled, for example, may differ for an administrator and a regular user.

Various non-limiting examples may serve to further illustrate the disclosed firewall control system 100. In one example previously discussed, the process interrogation controller 124 may block data to and from a P2P client application 112 if processes 114 associated with high-bandwidth programs such as videoconferencing software or a remote control program are currently running. In another example, the process interrogation controller 124 may block data to and from all programs 112 (except those necessary to satisfy the condition) if a corporate-approved anti-virus software package is not currently running (i.e., the processes 114 associated with it are not running) or with virus definitions that are dated before a specified time, such as two weeks previously. In yet another example, the process interrogation controller 124 may block data to and from a user computer system 102 until all security applications have launched (detected via their processes 114), such as anti-virus programs, security monitoring programs, spyware blockers, and the like.

FIG. 2 depicts a block diagram of one embodiment of a computer system 200 suitable for use as a component of the firewall control system 100, such as a user computer system 102. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200. Computer system 200 may be utilized to implement the user computer system 102, firewall 120 and/or process store 108.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the firewall 120 (including the process interrogation controller 124), such as by interrogating processes of the user computer system 102 and analyzing the results, and may temporarily or permanently store information during its calculations or results after calculations in storage 204 or memory 206. All or part of the process interrogation controller 124, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a user computer system 102 requesting an application 112 to send data, for example, may utilize the keyboard 222 and mouse 220 to interact with their computer system. The bus 212 may also connect the processor 202 to a display, such as an LCD display or CRT monitor, via the display adapter 210.

FIG. 3 depicts a conceptual illustration of software components of a process interrogation controller 124 according to some embodiments. The process interrogation controller 124 may be implemented on a computer system 200 such as described in relation to FIG. 2, including on a user computer system 102 (as part of a personal firewall) or on a server (as part of a network or other non-personal firewall). As described previously, the process interrogation controller 124 may communicate with the network stack 122 and may provide further control of access to data packets. The process interrogation controller 124 may include components to assist it with its functions, including a user interface module 302, a condition configuration module 304, a process monitor 306, a process store interface module 308, a process-condition analyzer, a firewall interface module 320, and a firewall action manager 322. One of ordinary skill in the art will recognize that the functionality of each component of the process interrogation controller 124 may be combined or divided in any fashion and the description herein is merely intended to be illustrative of some embodiments.

The user interface module 302 may facilitate communication to and from a user, including transmitting and receiving requests and information with an administrator of the firewall 120 or a user of the user computer system 102. The condition configuration module 304 may establish process rules for a particular application 112. In some embodiments, the condition configuration module 304 may set process rules for a program 112 based on user input. In other embodiments, the condition configuration module 304 may set standard or default process rules for a particular program 112, such as based on administrator preferences or application-provider preferences. The process monitor 306 may monitor the current status of processes 114 of the user computer system 102, including whether the processes 114 are active or not as well as particulars about their operations (e.g., date of a virus configuration file). The process store interface module 308 may facilitate communication to and from the process store 108, including storing an indication of process rules for particular applications 112 in the process store 108 and accessing process rules upon request of the process-condition analyzer 310.

The process-condition analyzer 310 may determine whether conditions of the process rules are satisfied based on the current status of the processes 114 of the process rule. To accomplish this task, the process-condition analyzer 310 may utilize status information gathered by the process monitor 306 as well as process rules established by the condition configuration module 304 and stored in the process store 108. The process-condition analyzer 310 may thus compare the process rules with the current state of processes 114 of the user computer system 102 to "fine-tune" control of firewall 120. Results of the comparison may be passed to the firewall action manager 322 for firewall control.

After the comparison has been made, the firewall action manager 322 may then perform various firewall actions in response to the comparison, such as by allowing or denying data access, monitoring data packets, or redirecting data packets to another device. Allowing or denying data access may be performed for part or all of traffic (either incoming or outgoing or both) for a program 112. Redirection of data (also known as port forwarding when data packets are forwarded to and from a specific port number) may also be used by the firewall action manager 322 as one of its actions. The firewall action manager 322 may thus react to the current active processes 114 of the user computer system 102 by restricting data packets in some fashion either when certain processes are not running (e.g., up-to-date virus software) or are running (e.g., resource-intensive applications). The firewall interface module 320 may serve as the interface between the process interrogation controller 124 and the other components of the firewall 120, such as the network stack 122.

Figure 4:
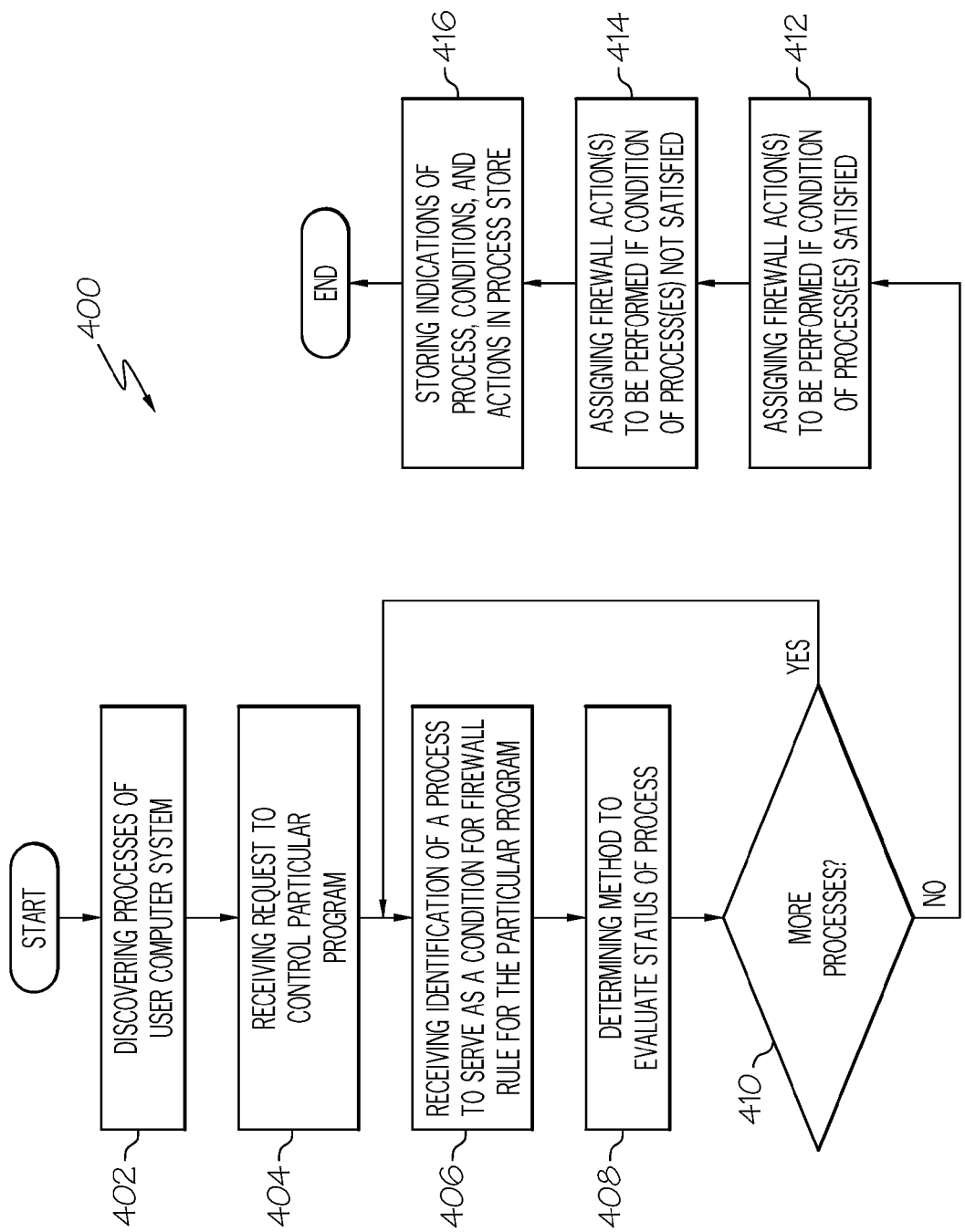
FIG. 4 depicts an example of a flow chart for configuring control of a firewall for particular programs according to some embodiments.

FIG. 4 depicts an example of a flow chart 400 for configuring control of a firewall for particular programs according to some embodiments. The method of flow chart 400 may be performed, in one embodiment, by components of the process interrogation controller 124.

Flow chart 400 begins with element 402, discovering processes of the user computer system 102 to be controlled. At this element, the process monitor 306 may interrogate the user computer system 102 to determine the status of various processes 114 executing on the user computer system. Element 402 may be performed at any time during the performance of method 400 and is shown as the first element as a matter of convenience. The process interrogation controller 124 may at element 404 receive a request to control a particular program 112. The request may originate from a user, from a network administrator or firewall administrator, based on predetermined standards for performing control, or other fashion. At element 406, the process interrogation controller 124 may receive identification of a process 114 to serve as a condition for a firewall rule for the particular program 112, such as by accessing process rules for the program 112 stored in the process store 108. The identification of a process may be included in the request to control the program 112 in some embodiments. A user may establish process rules in any fashion, such as by selecting from a list of currently running processes, selecting from a list of executables found on the filesystem, querying the operating system for known processes, or other methodology. For performance reasons, a list of executables found on the filesystem may be discovered and maintained separate to method 400 so that the process interrogation controller 124 need not wait for potentially time consuming discovery to complete.

At element 408, the process interrogation controller 124 may determine the method to evaluate the status of a particular process 114 Likely sources of information for determining the method include executable file information (e.g., file size, version, last modified date, etc.), an API call to the process 114, an operation system database query (such as to the Microsoft Windows Registry via the Windows Management Interface (WMI) specification), or a process information look-up (such as via the WMI specification such as to obtain status, path, priority, size, data written, etc.). The method of evaluation may be the existence of the process 114 itself (if it is active, if it is inactive), an aspect of the process 114 (e.g., is it recent enough?), or other methodology. At decision block 410, the method may determine whether more processes will serve as conditions and, if so, the method returns to element 406 for additional processing, providing the ability to establish process rules that include a plurality of processes 114 serving as conditions.

At element 412, the process interrogation controller 124 may assign one or more firewall actions to be performed if the conditions of the processes 114 are satisfied. Similarly, at element 414, the process interrogation controller 124 may assign one or more firewall actions to be performed if the conditions of the processes 114 are not satisfied. The particular firewall actions may be included in the request to control the program 114, may be received from a user or administrator, or other source. After assigning the firewall actions, the process interrogation controller 124 may store indications of the processes 114, conditions, and firewall actions in a process rule stored in the process store 108, after which the method terminates. The process store 108 may thus include process rules for different programs 112 of the user computer system 102 and, for multi-users systems, individual or group process rules for different user/program combinations.

Figure 5:
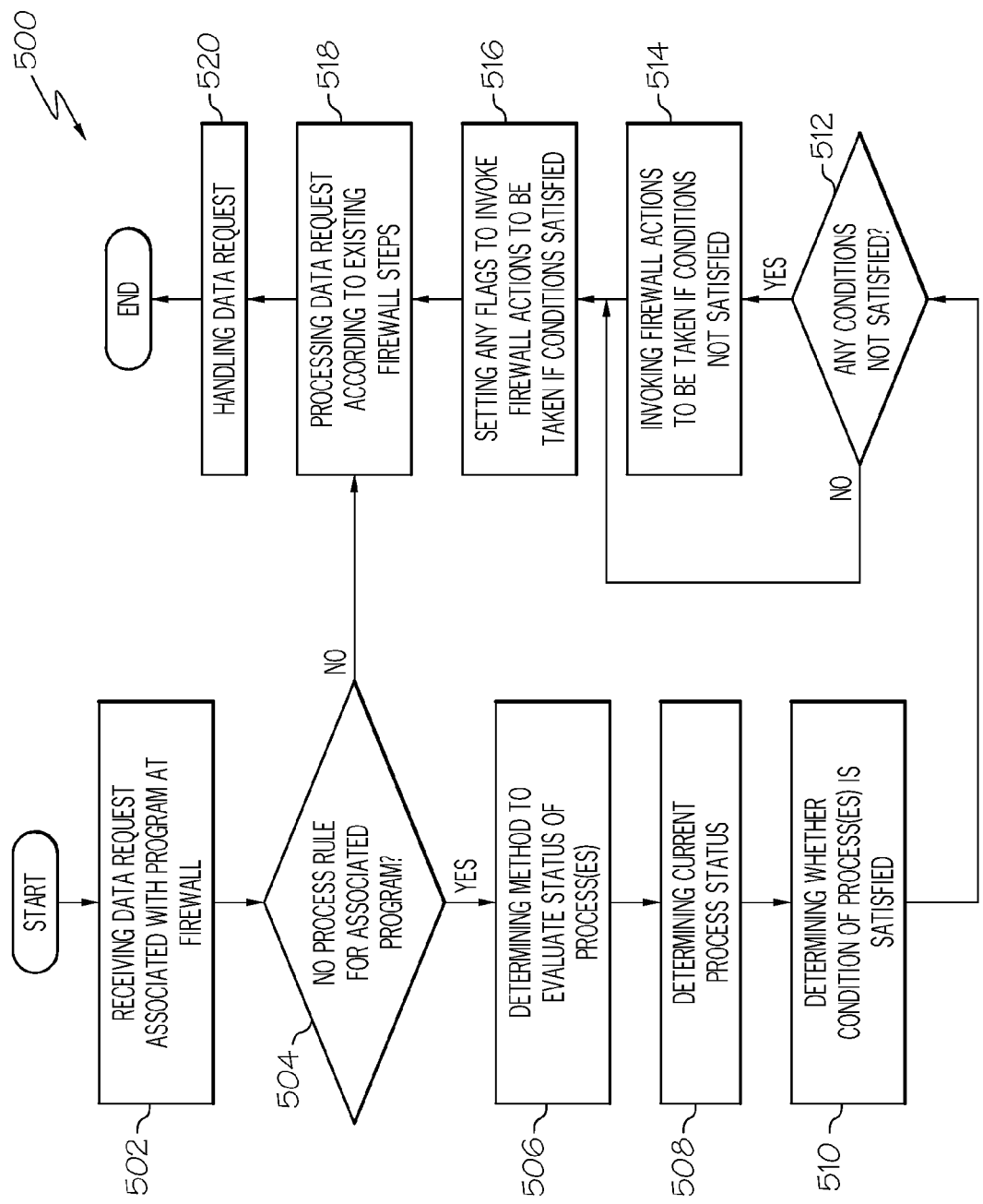
FIG. 5 depicts an example of a flow chart for controlling a firewall based on process interrogation according to some embodiments.

FIG. 5 depicts an example of a flow chart 500 for controlling a firewall 120 based on process interrogation according to some embodiments. The method of flow chart 500 may be performed, in one embodiment, by components of the firewall 120, such as the process interrogation controller 124. Flow chart 500 begins with element 502, receiving a data request at a firewall 120. In one embodiment, element 502 may include the process interrogation controller 124 receiving an indication of a received data packet from the network stack 122. The data request may include a data packet and an indication of a particular program 112 that is transmitting or receiving the data packet and is thus associated with the data request.

After receiving a data request, the process interrogation controller 124 may determine whether one or more process rules exist for the program 112 associated with the data request. If no process rules exist, the firewall 120 (and its network stack 122) may process the data request according to existing firewall steps at element 518 and handle the data request at element 520, after which the method may terminate or return to element 502 for further processing. The existing firewall rules may thus exist in conjunction with the firewall actions of method 500. Element 518 may optionally be performed before or simultaneously with the other elements of method 500 that utilize the firewall actions based on process interrogation. In some embodiments, for example, element 518 may be performed in parallel in a parallel processing architecture with other elements of method 500. In yet other embodiments, the different elements may be implemented as separate threads run synchronously, where a failed condition in any thread may trigger cancellation of other threads. At element 520 the data request may be allowed, denied, or partially allowed according to the firewall rules.

If a process rule exists for the associated program 112, the process interrogation controller 124 may at element 506 determine the method to evaluate the status of the relevant processes 114 and may also at element 508 determine the current process status on the user computer system 102. At element 510, the process interrogation controller 124 may determine (using the determined evaluation method) whether the condition of the process rule is satisfied based on the current status of the process(es) 114. If any conditions are not satisfied at decision block 512, the process interrogation controller 124 may at element 514 invoke one or more firewall actions to be taken if the conditions are not satisfied. At element 516, the process interrogation controller 124 may set any flags to invoke firewall actions to be taken if the conditions are satisfied (which will only execute if all other firewall rules are met).

The firewall 120 may then process the data request according to existing firewall steps at element 518, as described previously, using any flags set at element 516. The method of flow chart 500 may thus provide for improved control of a firewall 120 by facilitating program-specific authentication plans that allow control of data flow on a program-by-program basis.

It will be apparent to those skilled in the art having the benefit of this disclosure that the present invention contemplates methods, systems, and media for implementing a firewall control system responsive to process interrogations. It is understood that the form of the invention shown and described in the detailed description and the drawings are to be taken merely as examples. It is intended that the following claims be interpreted broadly to embrace all the variations of the example embodiments disclosed.

What is claimed is:

1. A method for controlling a firewall for a user computing system, said method comprising:
   receiving, by a processor of a computer system, a data request at the firewall, the data request being associated with control of a program of the user computing system;
   said processor determining that a process rule exists for the program, the process rule comprising a condition to be satisfied for a process of the user computing system, the process rule having been generated based on preferences received by a process interrogation controller in the firewall, the process rule being stored in a storage unit of the firewall, the user computing system, or a remote server;
   in response to the determining that the process rule exists for the program, said processor further determining a manner for evaluating a status of the process and determining a current status of the process, wherein said determining the manner for evaluating comprises searching executable file information, calling an application program interface, or querying an operation system database;
   said processor determining, using the determined manner for evaluating, whether the condition of the process rule is satisfied based on the current status of the process; and
   in response to determining whether the condition of the process rule is satisfied, said processor performing one or more firewall actions comprising allowing or denying access to data packets, monitoring data packets, or redirecting data packets to another device.

2. The method of claim 1, wherein the data request is a request to control the program based on the process.

3. The method of claim 2, wherein the request to control the program includes an identification of the process.

4. The method of claim 1, wherein the data request includes a data packet and an indication of the program, wherein the program is transmitting or receiving the data packet.

5. The method of claim 1, wherein the firewall is a hardware firewall.

6. The method of claim 1, wherein the status of the process is an indication of whether or not the process is currently executing.

7. The method of claim 1, wherein the status of the process is an indication of whether or not the process is sufficiently recent.

8. A computer program product, comprising a computer physically tangible storage device having a computer readable program code stored therein, said program code configured to be executed by a processor of a computer system to implement a method for controlling a firewall for a user computing system, said method comprising:
   said processor receiving a data request at the firewall, the data request being associated with control of a program of the user computing system;
   said processor determining that a process rule exists for the program, the process rule comprising a condition to be satisfied for a process of the user computing system, the process rule having been generated based on preferences received by a process interrogation controller in the firewall, the process rule being stored in a storage unit of the firewall, the user computing system, or a remote server;
   in response to the determining that a process rule exists for the program, said processor further determining a manner for evaluating a status of the process and determining a current status of the process, wherein said determining the manner for evaluating comprises searching executable file information, calling an application program interface, or querying an operation system database;
   said processor determining, using the determined manner for evaluating, whether the condition of the process rule is satisfied based on the current status of the process; and
   in response to determining whether the condition of the process rule is satisfied, said processor performing one or more firewall actions comprising allowing or denying access to data packets, monitoring data packets, or redirecting data packets to another device.

9. The computer program product of claim 8, wherein the data request is a request to control the program based on the process.

10. The computer program product of claim 9, wherein the request to control the program includes an identification of the process.

11. The computer program product of claim 8, wherein the data request includes a data packet and an indication of the program, wherein the program is transmitting or receiving the data packet.

12. The computer program product of claim 8, wherein the firewall is a hardware firewall.

13. The computer program product of claim 8, wherein the status of the process is an indication of whether or not the process is currently executing.

14. The computer program product of claim 8, wherein the status of the process is an indication of whether or not the process is sufficiently recent.

15. A computer system comprising a processor, a memory coupled to the processor, and a computer readable storage device coupled to the processor, said storage device containing program code configured to be executed by the processor via the memory to implement a method for controlling a firewall for a user computing system, said method comprising:

said processor receiving a data request at the firewall, the data request being associated with control of a program of the user computing system;

said processor determining that a process rule exists for the program, the process rule comprising a condition to be satisfied for a process of the user computing system, the process rule having been generated based on preferences received by a process interrogation controller in the firewall, the process rule being stored in a storage unit of the firewall, the user computing system, or a remote server;

in response to the determining that a process rule exists for the program, said processor further determining a manner for evaluating a status of the process and determining a current status of the process, wherein said determining the manner for evaluating comprises searching executable file information, calling an application program interface, or querying an operation system database;

said processor determining, using the determined manner for evaluating, whether the condition of the process rule is satisfied based on the current status of the process; and in response to determining whether the condition of the process rule is satisfied, said processor performing one or more firewall actions comprising allowing or denying access to data packets, monitoring data packets, or redirecting data packets to another device.

16. The computer system of claim 15, wherein the data request is a request to control the program based on the process.

17. The computer system of claim 16, wherein the request to control the program includes an identification of the process.

18. The computer system of claim 15, wherein the data request includes a data packet and an indication of the program, wherein the program is transmitting or receiving the data packet.

19. The computer system of claim 15, wherein the firewall is a hardware firewall.

20. The computer system of claim 15, wherein the status of the process is an indication of whether or not the process is currently executing.

* * * * *